(12) United States Patent
Lee et al.

(10) Patent No.: US 8,714,783 B2
(45) Date of Patent: May 6, 2014

(54) OPTICAL LENS AND LIGHT SOURCE MODULE, AND STREET LAMP HAVING THE SAME

(75) Inventors: Chang Mo Lee, Gangwon-do (KR); Sang Ho Yoon, Gyunggi-do (KR); Hyung Jin Kim, Seoul (KR); Kyeong Ik Min, Gyunggi-do (KR); Dong Yeoul Lee, Gyunggi-do (KR); Ki Un Lee, Gyunggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 266 days.

(21) Appl. No.: 13/226,000

(22) Filed: Sep. 6, 2011

(65) Prior Publication Data

US 2012/0057354 A1    Mar. 8, 2012

(30) Foreign Application Priority Data

Sep. 6, 2010    (KR) .................. 10-2010-0087176

(51) Int. Cl.
*F21V 5/04*    (2006.01)
(52) U.S. Cl.
USPC ............... 362/311.09; 362/338; 362/296.06; 362/311.1

(58) Field of Classification Search
None
See application file for complete search history.

(56) References Cited

U.S. PATENT DOCUMENTS

| | | | | |
|---|---|---|---|---|
| 3,886,347 A * | 5/1975 | Dorman | | 362/311.09 |
| 5,152,788 A * | 10/1992 | Isaacson et al. | | 623/6.13 |
| 8,025,429 B2 * | 9/2011 | Ho et al. | | 362/311.02 |
| 2011/0030765 A1 * | 2/2011 | Yang | | 136/246 |

FOREIGN PATENT DOCUMENTS

| | | |
|---|---|---|
| CN | 201255363 Y | 6/2009 |
| CN | 101609173 A | 12/2009 |
| CN | 201487711 U | 5/2010 |
| JP | 09-027641 | 1/1997 |
| KR | 10-2009-0127021 A | 12/2009 |
| TW | 345194 U | 11/2008 |
| TW | 200951369 A | 12/2009 |

* cited by examiner

*Primary Examiner* — Ashok Patel
(74) *Attorney, Agent, or Firm* — McDermott Will & Emery LLP (57) ABSTRACT

There are provided an optical lens and a light source module, and a street lamp having the same. The optical lens includes a concave dome shaped inner surface formed to have a similarly-oval shaped lower surface, and formed to include a plurality of light incident surfaces formed to be stepped along the inner surface thereof and stepped surfaces connecting the plurality of light incident surfaces to one another; and an outer surface formed to surround the inner surface.

24 Claims, 9 Drawing Sheets

FIG. 11

OPTICAL LENS AND LIGHT SOURCE MODULE, AND STREET LAMP HAVING THE SAME

CROSS-REFERENCE TO RELATED APPLICATIONS

This application claims the priority of Korean Patent Application No. 10-2010-0087176 filed on Sep. 6, 2010, in the Korean Intellectual Property Office, the disclosure of which is incorporated herein by reference.

BACKGROUND OF THE INVENTION

1. Field of the Invention

The present invention relates to an optical lens and a light source module, and a street lamp having the same.

2. Description of the Related Art

Alight emitting diode (LED), a kind of a semiconductor light source, is a semiconductor device capable of emitting light having various colors through the recombination of electrons and electron holes in a junction portion between p-type and n-type semiconductors when current is applied thereto. Since the LED has a prolonged lifespan, low power consumption, excellent initial driving characteristics, a high vibration-resistance, or the like, as compared to a light source using a filament, the demand for LEDs has continuously increased, in particular, a group III nitride semiconductor LED capable of emitting light of a blue family of short wavelength region has been much in demand.

Recently there have been many attempts to substitute existing outdoor lighting apparatuses, such as street lamps and the like, with lighting apparatuses using LEDs. However, in case of an LED, light is only emitted in a specific direction, rather than being uniformly emitting in all directions, and an orientation angle thereof is generally about 120°. In comparison with existing outdoor lighting apparatuses emitting light in all directions, the light distribution characteristic of an LED are largely different therefrom, and thus, there is are limitations in using an LED in an outdoor lighting apparatus. Therefore, in the case of an optical lens and a light source module, and a street lamp using the same, a design solution in which light emitted from a light source is induced to have a desired orientation angle and dark spots are not formed therein is required.

SUMMARY OF INVENTION

An aspect of the present invention provides an optical lens, formed to have a shape capable of improving an orientation angle of light emitted from a light source, and a light source module for inducing light to have a desired orientation angle using the optical lens, and a street lamp using the same.

According to an embodiment of the present invention, there is provided an optical lens including: a concave dome shaped inner surface formed to have a similarly-oval shaped lower surface and formed to include a plurality of light incident surfaces formed to be stepped along the inner surface thereof and stepped surfaces connecting the plurality of light incident surfaces to one another; and an outer surface formed to surround the inner surface.

The outer surface may have a convex aspheric shape and include first and second light exit surfaces provided to be respectively disposed in regions corresponding to both ends of a major axis in the similarly-oval shaped lower surface and to have different curvatures.

A curvature of the first and second light exit surfaces may be smaller than that of other light exit surfaces of the outer surface, and a curvature of the second light exit surface may be smaller than that of the first light exit surface.

The plurality of light incident surfaces may be formed to have respective widths, the sizes of which are gradually reduced from a lower part toward an upper part thereof.

The inner surface may include a plane part formed to be parallel with a major axis of the lower surface, and curved parts formed to connect the plane parts to one another.

The plurality of light incident surfaces may be formed to have respective angles gradually reduced from a lower part toward an upper part, the angles being formed with regard to the lower surface.

At least portions of the plurality of light incident surfaces are directly connected to each other.

A borderline between the light incident surfaces connected to each other may be parallel with the plane part.

The stepped surface may be formed to be positioned on a straight line extended from a center point of the lower surface toward the inner surface.

Widths of the stepped surfaces corresponding to the curved part of the inner surface may be gradually reduced toward the major axis of the lower surface.

The stepped surface may not be formed on a surface of the inner surface intersected with a major axis direction of the lower surface.

The outer surface may include a third light exit surface formed between the first and second light exit surfaces along a minor axis direction of the lower surface, and the third light exit surface may have a curvature greater than that of the first light exit surface. In this case, the third light exit surface may be a portion of a spherical surface having the center point of the lower surface as its center, and the first and second light exit surfaces are a portion of the spherical surface having two different points as their centers placed on the major axis of the lower surface, and the center point of the lower surface may be positioned between the centers of the first and second light exit surfaces.

A region in the outer surface corresponding to the center point of the lower surface may be formed to include a recessed part.

According to another embodiment of the present invention, there is provided a light source module including: a substrate; at least one light source disposed on the substrate; and an optical lens formed to include a concave dome shaped inner surface having a similarly-oval shaped lower surface, the concave dome shaped inner surface including a plurality of light incident surfaces formed to be stepped along the inner surface and stepped surfaces connecting the plurality of light incident surfaces to one another, and an outer surface formed to surround the inner surface.

The outer surface may have a convex aspheric shape and include first and second light exit surfaces provided to be respectively disposed in regions corresponding to both ends of a major axis in the similarly-oval shaped lower surface and to have different curvatures.

A curvature of the first and second light exit surfaces may be smaller than that of other light exit surfaces of the outer surface, and a curvature of the second light exit surface may be smaller than that of the first light exit surface.

The light source may be disposed by being horizontally moved by a predetermined distance from a center of the major axis to a region of the major axis corresponding to a position on which the first light exit surface is disposed.

The plurality of light sources and the optical lens may be disposed such that the second light exit surfaces are aligned in the same direction.

In this case, a hexagonal form formed by six of the optical lenses may be provided to have interior angles of 115 degrees with two apexes corresponding to a direction to which the first light exit surface of the plurality of optical lens is directed and a direction to which the second light exit surface thereof is directed, and interior angles of the remaining four apexes of 122.5 degrees.

According to another embodiment of the present invention, there is provided a street lamp including a light source module having an optical lens, the optical lens comprising: a substrate; at least one light source disposed on the substrate; and an optical lens formed to have a concave dome structure having a similarly-oval shaped lower surface, and formed to include an inner surface including a plurality of light incident surfaces formed to be stepped along the inner surface and stepped surfaces formed to connect the plurality of light incident surfaces to one another, and an outer surface formed to surround the inner surface.

The outer surface may have a convex aspheric shape and include first and second light exit surfaces provided to be respectively disposed at regions of both ends of a major axis in the similarly-oval shaped lower surface and to have different curvatures.

A curvature of the first and second light exit surfaces may be smaller than that of other light exit surfaces of the outer surface, and a curvature of the second light exit surface may be smaller than that of the first light exit surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings such that they could be easily practiced by those having skill in the art to which the present invention pertains. However, in describing the embodiments of the present invention, detailed descriptions of well-known functions or constructions will be omitted so as not to obscure the description of the present invention with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of other elements.

Figure 1:
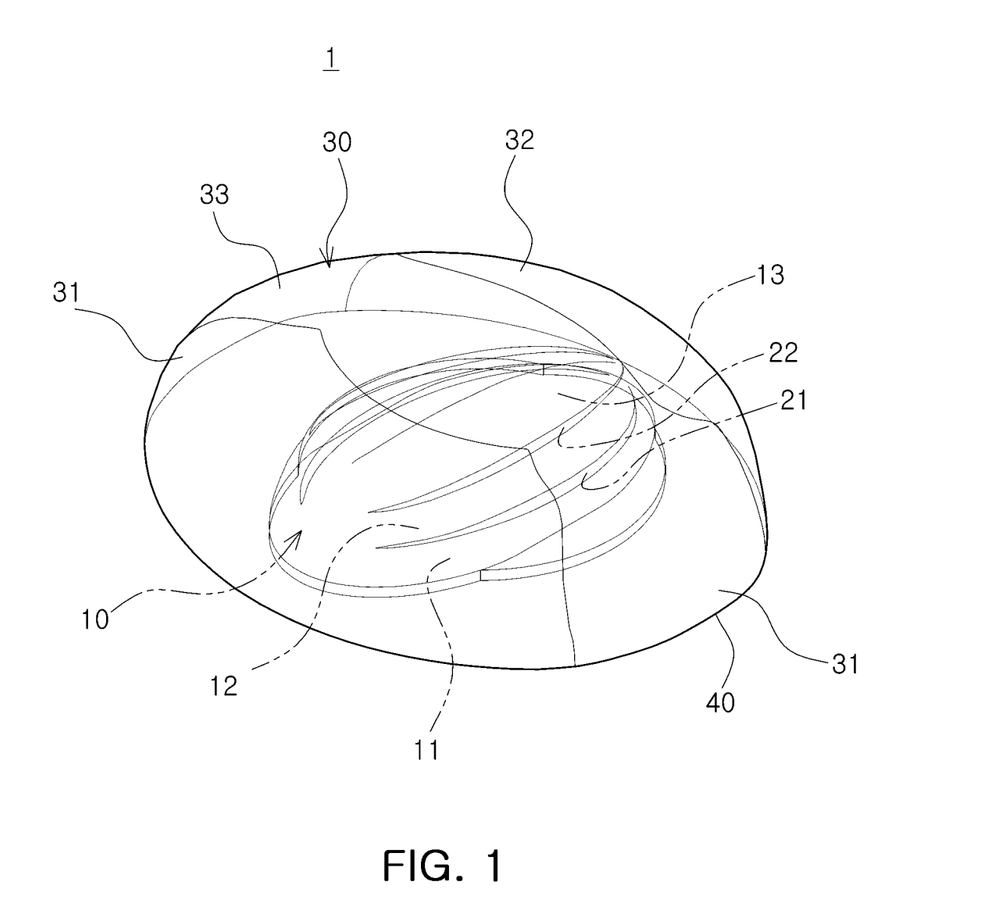
FIGS. 1 and 2 are a schematic perspective view and a plan view showing an optical lens according to an embodiment of the present invention.
Figure 2:
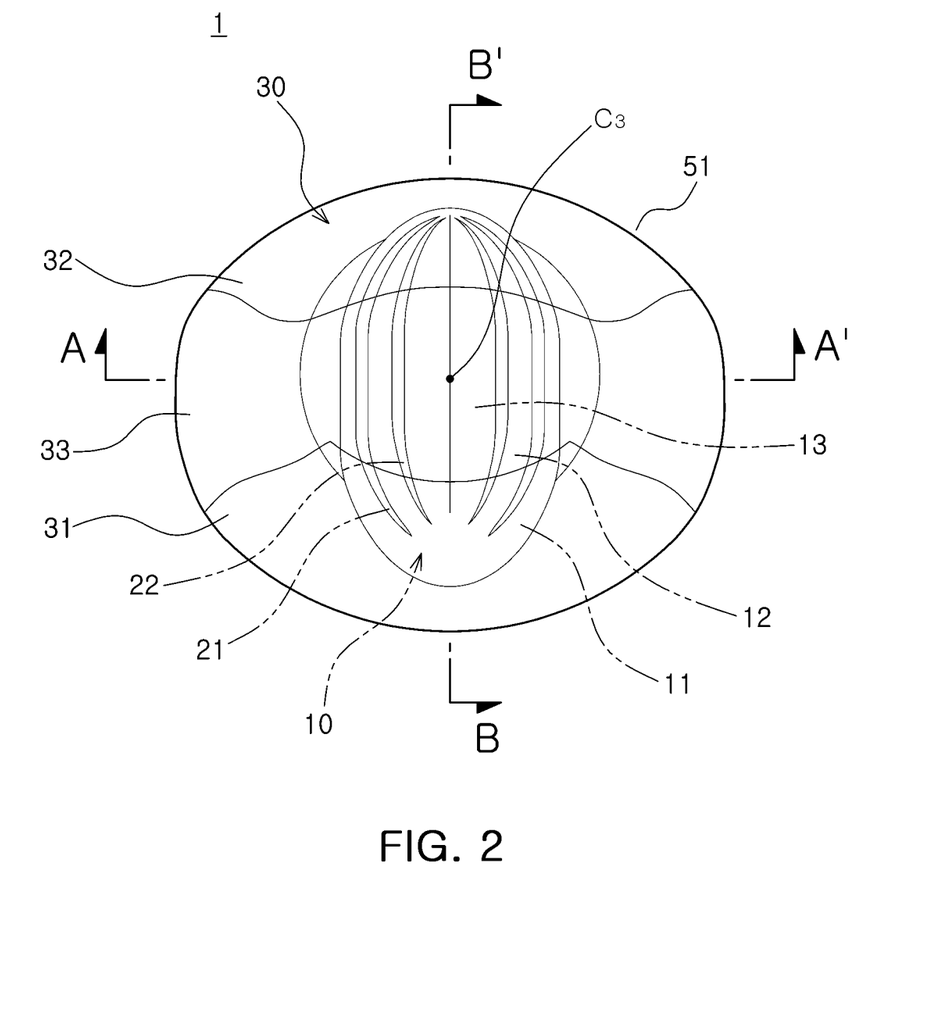
Figure 3:
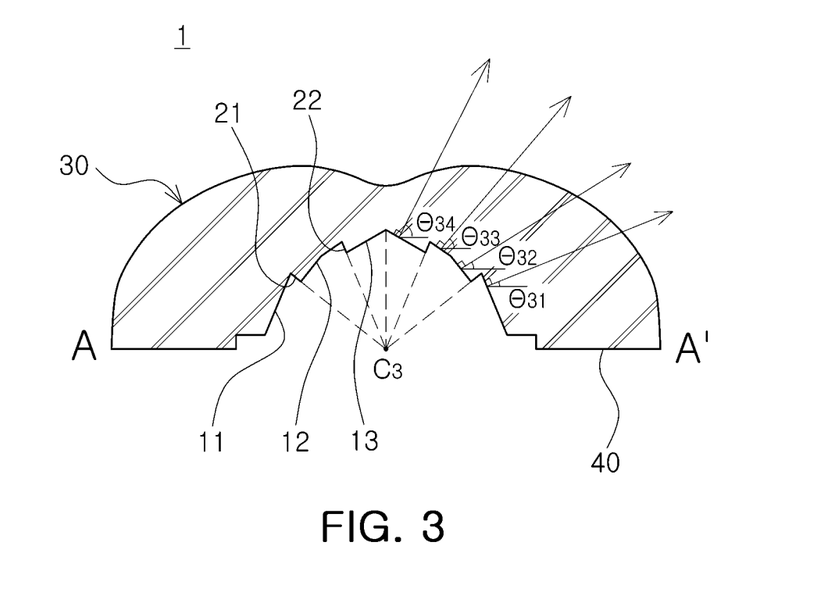
FIG. 3 is a cross-sectional view taken along line A-A' of FIG. 2.
Figure 4:
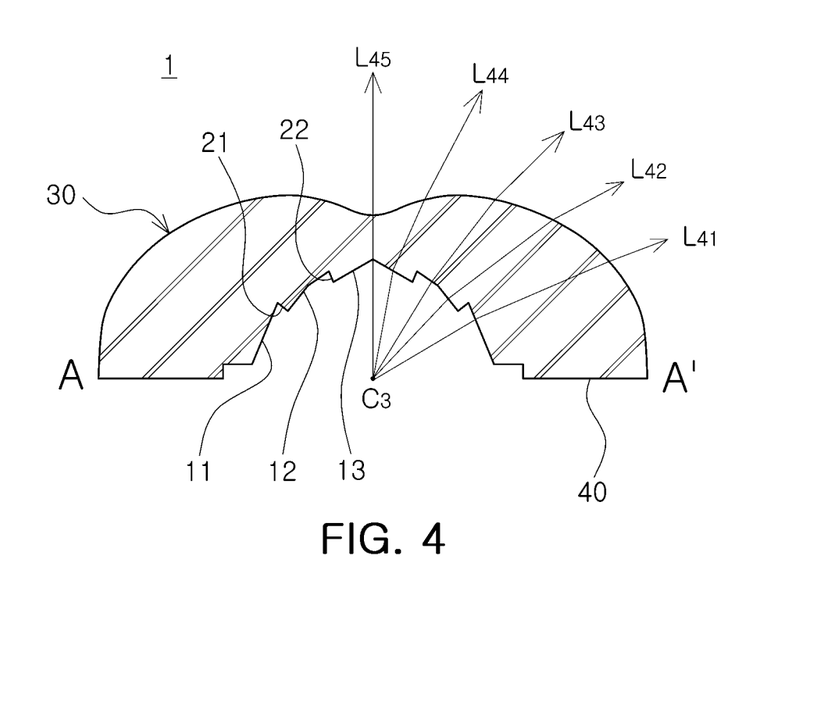
FIG. 4 is a schematic plan view showing paths of light passing through an optical lens according to the embodiment of the present invention.
Figure 5:
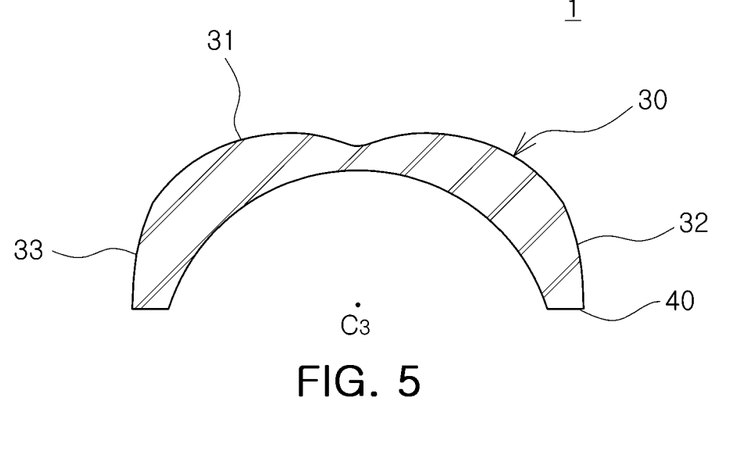
FIG. 5 is a cross-sectional view taken along line B-B' of FIG. 2.
Figure 6:
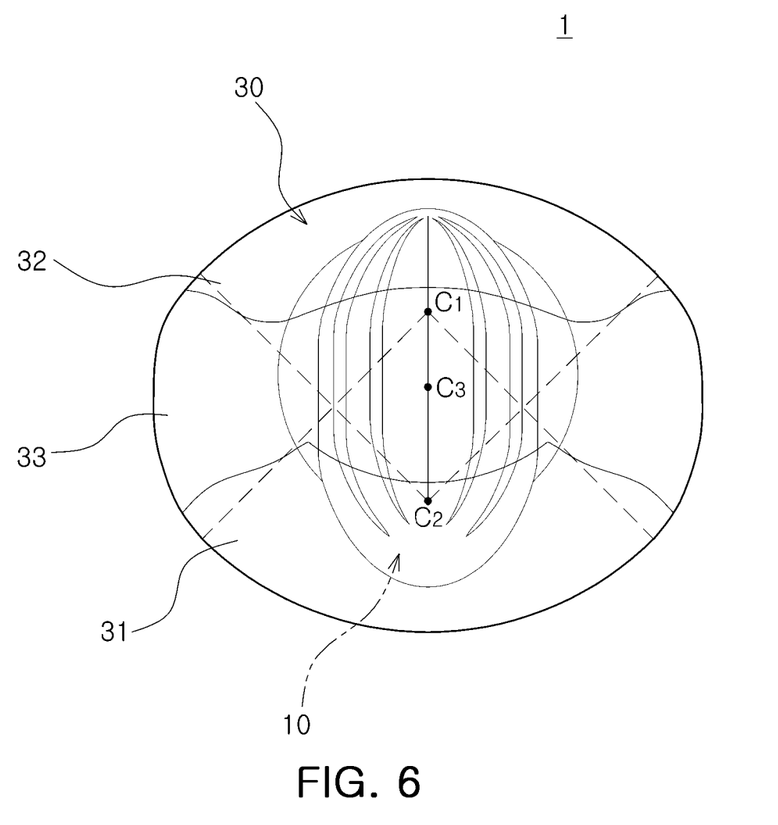
FIG. 6 is a plan view showing a configuration of an outer surface of the optical lens according to the embodiment of the present invention.
Figure 7:
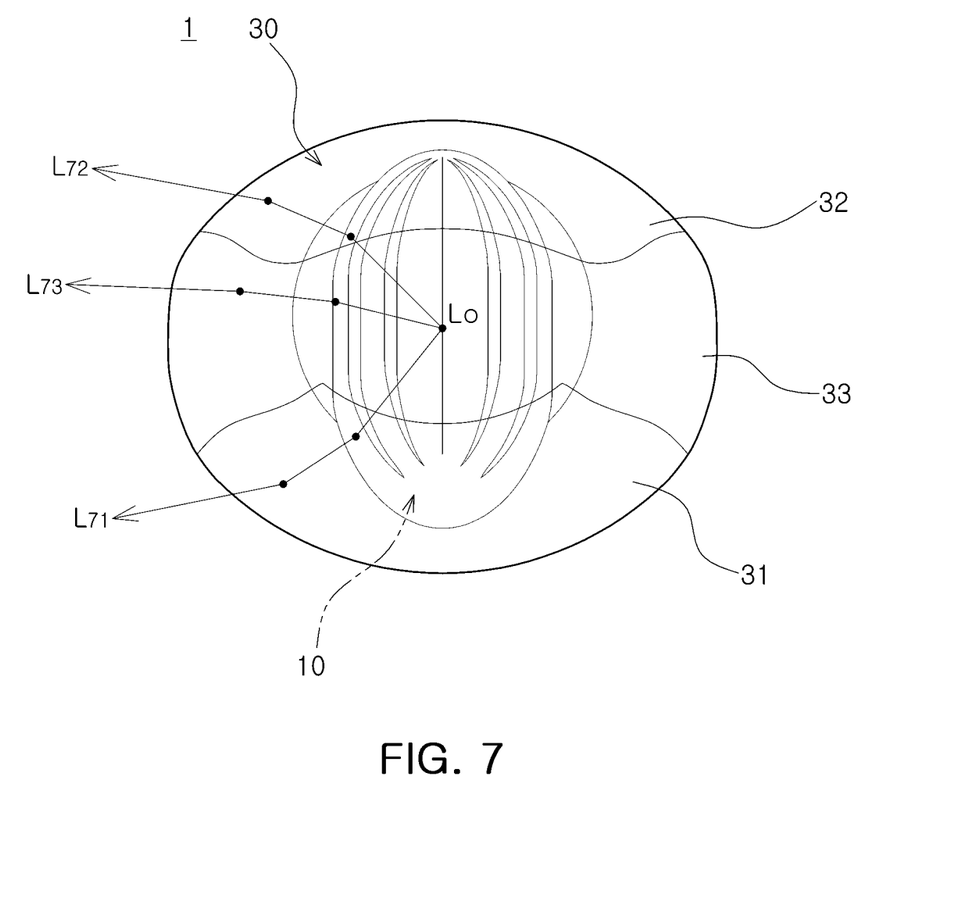
FIG. 7 is plan views illustrating a configuration of a light source module having an optical lens and an optical path therein according to an embodiment of the present invention.

FIGS. 1 to 7 schematically illustrate an optical lens according to an embodiment of the present invention. FIG. 1 is a perspective view of the optical lens, FIG. 2 is a plan view thereof, and FIG. 3 is a cross-sectional view taken along line A-A' of FIG. 2. FIG. 4 is a schematic plan view showing paths of light passing through the optical lens according to the embodiment of the present invention. FIG. 5 is a cross-sectional view taken along line B-B' of FIG. 2, and FIG. 6 is a plan view showing a configuration of an outer surface of the optical lens according to the embodiment of the present invention. FIG. 7 is a plan view illustrating paths of light emitted from a light source in an optical lens according to an embodiment of the present invention.

First, according to FIGS. 1 to 3, an optical lens 1 according to an embodiment of the present invention may be formed to have a dome structure surrounding one point on a plane, for example, a surface of a substrate, on which a light source is located, from an upper part thereof. The optical lens may be largely classified into an inner surface 10, an outer surface 30 and a lower surface 40 that is on an equal horizontal level to that of the plane on which the lower source is disposed. The inner surface 10 may be similarly-ellipsoidal shaped to be disposed lengthwise in a major-axis direction. The outer surface may be configured of three surfaces having different curvatures. The inner surface 10 may be formed to have a sawtooth structure in which multiple steps are formed to be parallel with the lower surface 40 along the inner surface, through which light emitted from a light source can be emitted with a constant horizontal and vertical orientation angle. According to the present embodiment, an inner surface structure, an outer surface structure and a lower surface structure of the optical lens, and an optical path through which light emitted from a light source passes through the optical lens including the constituent elements described above, will be sequentially described together with the description on a combination of the constituent elements.

First, the structure of the inner surface 10 is described in detail below. In the inner surface 10 of the optical lens 1, according to the present embodiment, with reference to FIG. 2, one straight line on a plane on which the optical lens 1 is disposed may be provided as a major axis, and the inner surface 10 may be formed symmetrically to the main axis. The inner surface 10 may basically have a dome shaped structure having an oval-similar shaped lower surface, relatively long in a main axis direction and relatively short in a direction of a minor axis orthogonal to that of the main axis at a point C3 that is provided as a central point of the lower surface of the inner surface 10 (hereinafter, referred to as a 'center point'), the point C3 being positioned on the plane on which the major axis and the optical lens 1 are provided. In this case, a half-cylindrical plane part is formed in the main axis direction, and curved parts are formed to be connected to the half-cylindrical plane part at regions of both ends thereof.

In addition, the inner surface 10 may be formed to include a saw-toothed shape that is formed in a multiple stepped shape along a circumference of the inner surface 10, which will be described in detail with reference to FIGS. 3 and 4. The inner surface 10 may be configured to include a plurality of light incident surfaces 11, 12 and 13, respectively tilted at predetermined vertical orientation angles θ31, θ32, θ33 and θ34 with respect to the lower surface 40; and stepped surfaces 21 and 22 connecting the light incident surfaces 11, 12 and 13, such that light L41, L42, L43, L44, L45 incident through the light incident surfaces 11, 12 and 13 of preset angles θ31, θ32, θ33 and θ34 are refracted toward peripheral parts rather than toward a center in the lens. According to the present embodiment, the inner surface 10 may be configured of a first light incident surface 11 formed to be connected between the lower surface and one surface of the first light incident surface, a second light incident surface 12 formed on the first light incident surface 11, and a third light incident surface 13 formed on the second light incident surface 12. A first stepped surface 21 may be formed between the first and second light incident surfaces 11 and 12, and a second stepped surface 22 may be formed between the second light incident surface 12 and the third light incident surface 13.

In this case, slopes of slope parts of the first to third light incident surfaces 11, 12 and 13, formed with respect to the lower surface 40, may be greatest in a slope part of the first light incident surface 11 and smallest in a slope part of the third light incident surface 13. That is, light emitted from the light source may be inputted to the incident surfaces approximately perpendicular to the light incident surface so as to reduce a total reflection and to refract and finally emit as much light as possible in a desired direction.

In addition, the first and second stepped surfaces 21 and 22 may be formed on, for example, straight paths extended from the center point C3. In other words, in order to prevent light emitted from the light source from being reflected and refracted in an undesired manner through the stepped surfaces, the first and second stepped surfaces 21 and 22 may be formed in a structure that does not interfere with the progression of light. As such, in place of connecting the light incident surfaces to one another by being directly extended with regard to the inner surface, the first and second stepped surfaces 21 and 22 may be formed such that the second light incident surface 12 may be nearer to the center point C3 than that of the first light incident surface 11, and the third light incident surface 13 may be nearer to the center point C3 than that of the second light incident surface 12, while maintaining an angle with which incident light enters the lens, thereby reducing an overall thickness of the optical lens 1. In this case, the second light incident surface 12 may include a bending part through which a slope of a sectional face varies. That is, on the boundary of the bending part, upper and lower light incident surfaces thereof may be formed in a directly connected structure, instead of being formed by the stepped surfaces 21 and 22 to have different slope angles with regard to the lower surface. The first and second stepped surfaces 21 and 22 described above may not necessarily be formed between the light incident surfaces, but may be selectively formed for a shape and a position thereof according to respective embodiments to be required for a use, shape and orientation angle of lens, or the like.

Referring to FIGS. 1 and 5, it may be known that the stepped surfaces 21 and 22 of the inner surface may be formed to have respective widths, the sizes of which are gradually reduced nearer to a main axis, while the stepped surface may not be formed at a portion of the inner surface provided to be crossed to the main axis. As such, at a region at which the inner surface is intersected to the main axis, although the stepped surfaces 21 and 22 are not formed and in a case in which a desired optical path can be obtained therefrom, only light incident surfaces may be connected to thus form a bending part or bending point, or may be smoothly connected to be curved shaped.

Subsequently, the outer surface 30 of the optical lens 1 according to the embodiment of the present invention is described in detail below. With reference to FIGS. 1 and 2, the outer surface 30 may be formed to surround the inner surface 10 and provided such that light induced to be refracted through the inner surface 10 is input thereto. The outer surface 30 according to the present embodiment may be formed to include three light exit surfaces, first to third light exit surfaces 31, 32 and 33, having different curvatures, which are combined with one another. The third light exit surface 33 may be lengthwise formed in the minor axis direction to be disposed between the first and second light exit surfaces 31 and 32. The first light exit surface 31 may be formed at one side of the major axis while being in contact with the third light exit surface 33. The second light exit surface 32 may be also formed at a region opposed to that of the first light exit surface 31 from the major axis direction while being contact with the third light exit surface 33.

In addition, referring to FIG. 6, shapes of the first to third light exit surfaces 31, 32 and 33 may be determined as described below. In a spherical surface with the center point C3 as its center, a shape of the third light exit surface 33 may be determined as a portion of a spherical surface larger than the inner surface 10. In a spherical surface with a point C1 as its center, spaced apart from the center point C3 at a predetermined interval in the major axis direction, a shape of the first light exit surface 31 may be determined as a portion of a spherical surface larger than the inner surface 10. Further, in a spherical surface with a point C2 as its center, spaced apart from the center point C3 at a predetermined interval on the minor axis at a point opposed to the point C1 of a center of the first light exit surface 31, the second light exit surface 32 may be determined as a portion of a spherical surface larger than the inner surface 10. In this case, in the case of spherical radiuses of the first to third light exit surfaces 31, 32 and 33, the third light exit surface 33 may be configured to have a shortest radius, and the second light exit surface 32 may be configured to have a longest radius.

Referring to FIG. 7, in the above-described cases, light L73 emitted through the third light exit surface 33 may pass through a relatively thickly formed region of the lens, but an angle of incidence through the third light exit surface 33 may be relatively small to thus allow light to be emitted without a large amount of refraction. Light L71 emitted through the first light exit surface 31 may be refracted by a relatively medium refraction level. Light L72 emitted through the second light exit surface 32 may be refracted at a relatively high refraction level. That is, light emitted toward the second light exit surface 32 may be provided such that as much light as possible may be refracted in a direction to which the third light exit surface 33 is directed, that is, in a minor axis direction of the lower surface.

Therefore, as described above, the inner surface 10 may be provided in a structure connected with the outer surface 20 in order to attain a common purpose of a refraction of light in a predetermined orientation angle. As shown in FIG. 2, the inner surface 10 may be lengthwisely formed in the main axis direction, and the outer surface 20 may be lengthwisely formed in the minor axis direction. The inner surface may be disposed at a relatively short distance from the outer surface 20 on the major axis direction, while being disposed relatively distantly therefrom in the major axis direction. As such, in a case in which the light source is disposed at a position of the center point C3, when light emitted in both end directions (the first and second light exit surface directions) of the major axis among light emitted in all directions from the center point is refracted on the inner surface 10 and the outer surface 20 and is finally emitted, a minor-axis directionally refracted effect may be obtained. That is, optical paths may be changed at an interface at which two materials having different indexes of refraction meet with each other, and light may be refracted toward a thick portion of a lens, that is, in the present embodiment having a structure in which the lens becomes thicker closer to the minor axis direction, light incident in the major axis direction may be refracted and emitted in the minor axis direction.

As such, the forms of the inner surface 10 and the outer surface 20 may be appropriately formed through the optical lens structure provided according to the embodiment of the present invention, thereby allowing for an exit direction of light to be induced with an angle of horizontal orientation in a desired direction. Referring to FIG. 7, it can be seen that optical paths L71, L72 and L73 are provided through which light exited from the light source disposed at the center point C3 to three different directions may be induced to a side thereof similarly to the above-described embodiment.

Further, the forms of the light incident surfaces 11, 12 and 13 and the stepped surfaces 21 and 22 may be appropriately formed through the optical lens structure proposed according to the present embodiment, thereby allowing light to be induced to have an exit direction with an angle of vertical orientation in a desired direction. Referring to FIG. 4, it can be seen that optical paths L41, L42, L43, L44 and L45 are provided, through which light exiting from the light source disposed at the center point C3 in three different directions may be induced to a side direction thereof by being deviated from a central axis of a lens, similarly to the above-description.

In addition, in the third light exit surface, a recessed part formed to be concave toward to an inner portion of the lens may be formed at a region meeting with the central axis of the lens, through which light emitted in the central axis direction of the lens is refracted or entirely reflected toward a peripheral part thereof and diffused.

Figure 9:
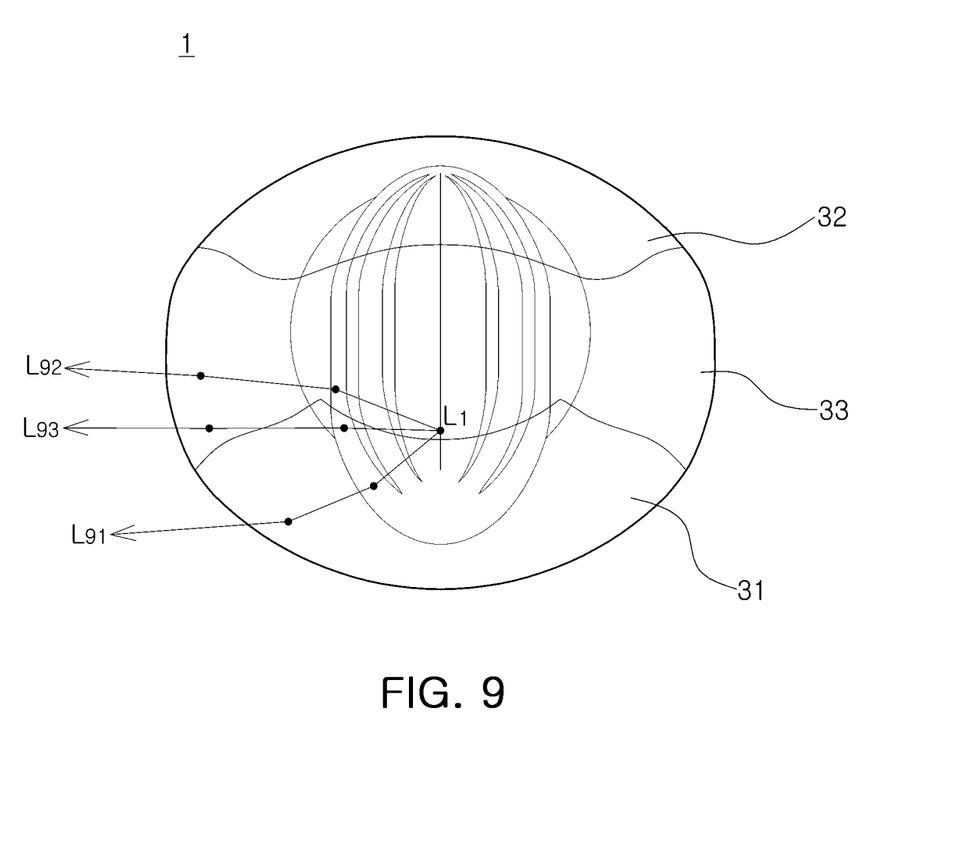
FIG. 9 is a plan view of an optical path of a case in which a light source is disposed at a position distanced apart from a center point in a second light exit surface direction at a predetermined interval.

FIGS. 7 and 9 illustrate a light source module having the optical lens according to the embodiment of the present invention and an optical path thereof. In this case, FIG. 7 illustrates a case in which the light source is disposed at the center point C3 and FIG. 9 illustrates an optical path in a case in which the light source is disposed at a position spaced apart from the center point in the second light exit surface direction at a predetermined interval. In this case, it is assumed that light exit angles in vertical directions all are the same as at positions of all light sources.

Referring first to FIG. 7, light exiting from the light source positioned at the center point may be refracted on the first light incident surface 11, and it is to be appreciated that the light incident angles are different from one another, and angles of refraction may have differences according to a thickness of a lens provided at a light incident position. Further, with reference to FIGS. 8 and 9, in a case in which the light source is moved in the first light exit surface 31 direction to be positioned at L1, it may be appreciated that light strongly tends to be induced toward to a side surface thereof as compared to a position L0 at the center point C1. Therefore, a lens shape may be formed according to embodiments and further, optical paths L91, L92 and L93 are provided, through which an emission of light may be induced toward a side surface direction as the light source is moved in the first light exit surface 31 direction as described above.

Figure 8:
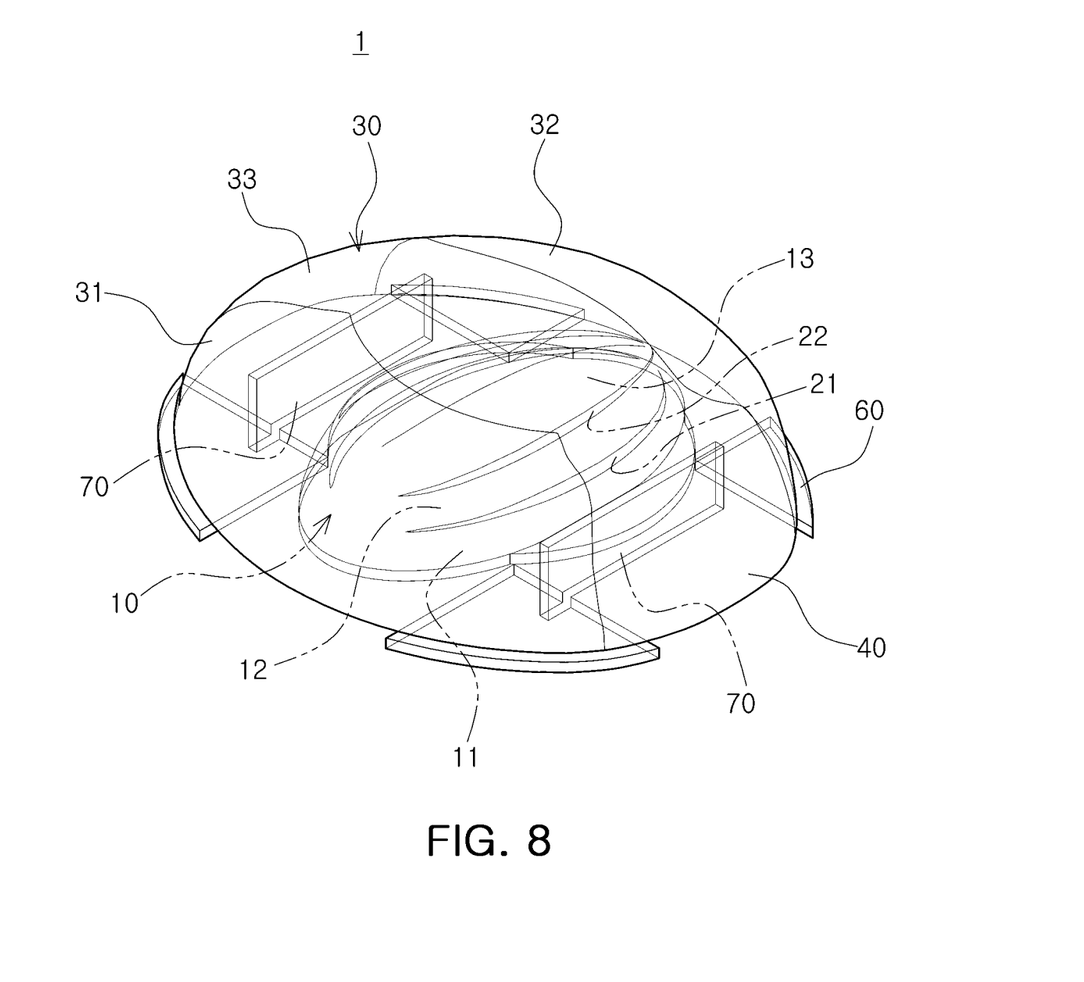
FIG. 8 is a perspective view of an optical lens including a groove part and a support part according to another embodiment of the present invention.

Then, the lower surface of the optical lens 1 according to the embodiment of the present invention is described in detail. FIG. 8 provides another embodiment of the present invention, and in this case, the lower surface may be formed to include a groove part 70 and a support part 60. The support part 60 may serve to be spaced apart from between lens and a substrate at a predetermined interval in a case in which the optical lens 1 according to the present embodiment is mounted on the substrate, or may be formed to be fitted to a groove in the substrate such that the optical lens 1 may be stably fixed to the substrate. In addition, in the case of a groove part, the groove part 70 may be formed to prevent a lens from being damaged due to a thermal expansion at the time of a lens forming process. The groove part may be formed in both side surfaces of the third light 33 exit surface of a lens, a relatively thick region, without any defects with regard to an optical path, thereby preventing the lens from being damaged or undesirably deformed due to a buffering reaction using the groove part 70 even in a case in which the lens is expanded by heat.

Figure 10:
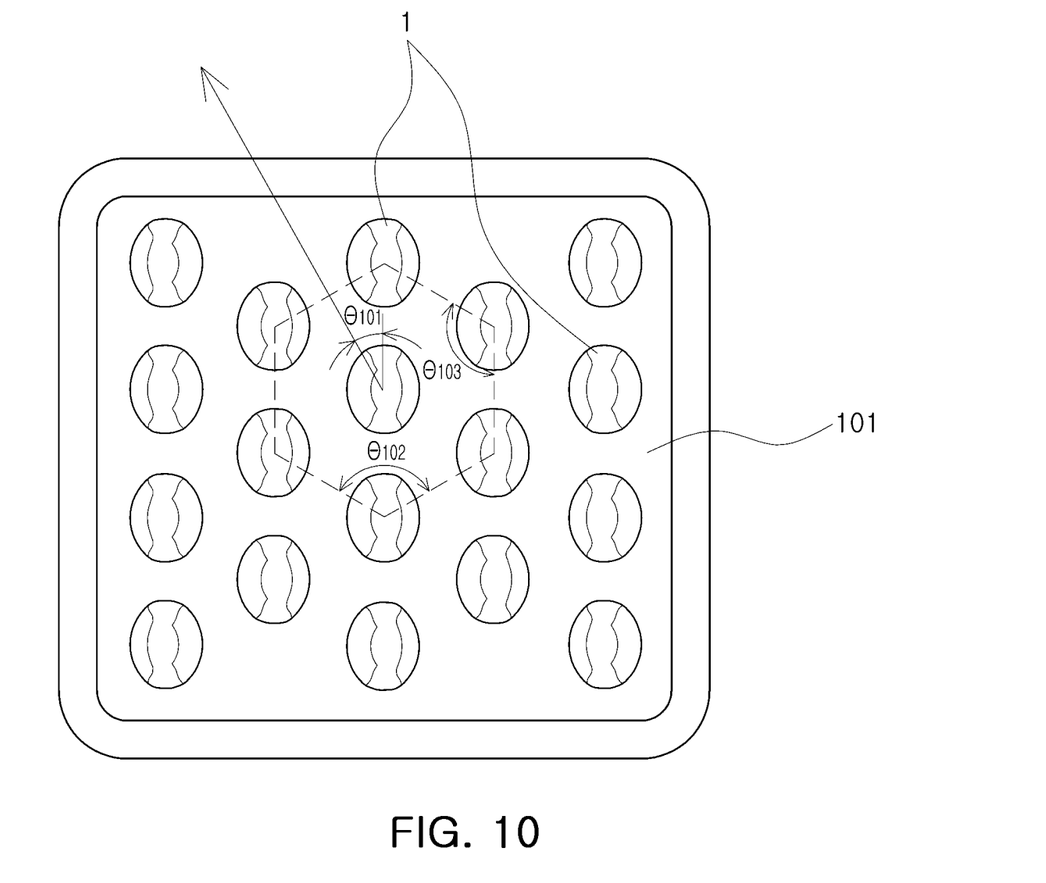
FIG. 10 is a plan view illustrating a layout example of light source modules disposed in a line on a substrate according to the embodiment of the present invention.

FIG. 10 is a plan view illustrating a layout example of light source modules disposed in a line on a substrate 101 according to an embodiment of the present invention. In this case, a plurality of optical lenses 1 may be arrayed in a line such that the first light exit surface is directed toward a left side thereof, and in the vicinity of one optical lens 1, six lenses may be disposed to surround one optical lens 1 in the form of hexagon. In an interior angle of the hexagonal, for example, when a direction in which the first light exit surface is formed is regarded as a front of the lens, an interior angle of both side surface parts θ102 of the lens may be 115 degrees, and the remaining four interior angles θ103 may respectively be 12.5 degrees. In the configuration described above according to the present embodiment, on the direction to which the first light 31 exit surface is directed, a loss of light exited in orientation angle θ101 within a range between 50 and 70 degrees to left and right side surfaces thereof may be significantly reduced, the loss of light occurring by being blocked by an neighboring lens. However, the present invention is not limited to the configuration described above, but a configuration allowing for a substantial reduction of a loss of light with regard to a desired orientation angle may be applied through various column and row arrays of lenses, according to embodiments of the present invention.

Figure 11:
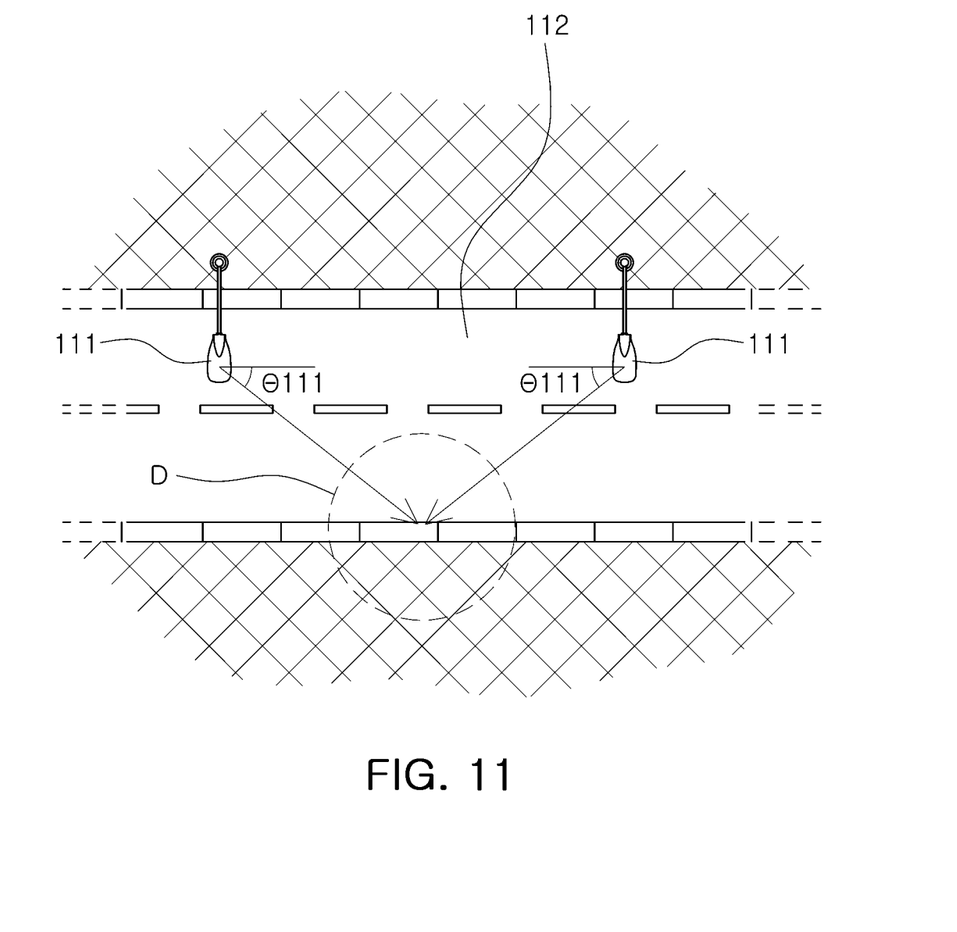
FIG. 11 is a plan view illustrating an example of the disposition and configuration of street lamps to which light source modules according to the embodiment of the present invention are applied.

FIG. 11 illustrates a configuration example in which street lamps 111 are disposed and to which the light source modules according to the embodiment of the present invention are applied. In this case, although not specifically described, the street lamp 111 may include, for example, a support disposed to stand vertically with respect to the ground, a lamp structure arm disposed on the support, a light source module provided on a lower surface part of the lamp structure arm to illuminate the ground, a radiant heat member disposed on an upper part of the light source module, and a power supply/distribution board/cable for supplying power to the light source module, or the like. The street lamp 111 may illuminate the street around the street lamp 111 by operating the light source module using power applied from the power supply/distribution board. For example, in a case in which the light source module uses a semiconductor light emitting device as a light source which is limited to a comparatively small range of orientation angles, as proposed above, according to the present embodiment, in particular, in a case in which street lamps are disposed on one side only on the street; a dark part D may be formed, to which light does not reach. Accordingly, a light source module according to an embodiment of the invention may be used, and a lens designed to determine an orientation angle θ111 toward a dark part direction may be used for the light source module, thereby allowing the street lamp 111 to be capable of uniformly lighting an entirety of a road surface 112.

As set forth above, in the case of an optical lens according to an embodiment of the present invention, light emitted from a light source may have a relatively large angle with regard to an optical axis while being refracted through the optical lens, thereby allowing light to be induced with a desired orientation angle. In addition, a light source module and a street lamp having an excellent light distribution characteristics may be achieved by using an optical lens according to an embodiment of the present invention.

While the present invention has been shown and described in connection with the embodiments in the, it will be apparent to those skilled in the art that modifications and variations can be made without departing from the spirit and scope of the invention as defined by the appended claims.

What is claimed is:

1. An optical lens having a flat base, the optical lens comprising:
   a concave dome shaped inner surface having an oval-shaped cross-section in a plane parallel to the flat base, and including a plurality of light incident surfaces stepped along the inner surface thereof and a plurality of stepped surfaces connecting the plurality of light incident surfaces to one another; and
   an outer surface surrounding the inner surface.

2. The optical lens of claim 1, wherein the outer surface has a convex aspheric shape and includes first and second light exit surfaces provided to be respectively disposed in regions corresponding to both ends of a major axis of the oval-shaped cross-section and to have different curvatures.

3. The optical lens of claim 2, wherein a curvature of the first and second light exit surfaces is smaller than that of other light exit surfaces of the outer surface, and the curvature of the second light exit surface is smaller than that of the first light exit surface.

4. The optical lens of claim 1, wherein the plurality of light incident surfaces have respective widths, sizes of which are gradually reduced from a lower part toward an upper part.

5. The optical lens of claim 1, wherein the inner surface includes a plane part parallel with a major axis of the oval-shaped cross-section, and curved parts connecting the plane part.

6. The optical lens of claim 1, wherein the plurality of light incident surfaces have respective angles gradually reduced from a lower part toward an upper part, the angles being formed with regard to the flat base.

7. The optical lens of claim 1, wherein at least portions of the plurality of light incident surfaces are directly connected to each other.

8. The optical lens of claim 7, wherein the inner surface includes a plane part parallel with a major axis of the oval-shaped cross-section, and a borderline between the light incident surfaces connected to each other is parallel with the plane part.

9. The optical lens of claim 1, wherein the stepped surface is positioned on a straight line extended from a center point of the oval-shaped cross-section toward the inner surface.

10. The optical lens of claim 1, wherein widths of the stepped surfaces corresponding to the curved part of the inner surface are gradually reduced toward the major axis of the oval-shaped cross-section.

11. The optical lens of claim 1, wherein the stepped surface is not disposed on a surface of the inner surface intersected to a major axis direction of the oval-shaped cross-section.

12. The optical lens of claim 2, wherein the outer surface includes a third light exit surface disposed between the first and second light exit surfaces along a minor axis direction of the oval-shaped cross-section, and the third light exit surface has a curvature greater than that of the first light exit surface.

13. The optical lens of claim 12, wherein the third light exit surface is a portion of a spherical surface having the center point of the oval-shaped cross-section as its center, and the first and second light exit surfaces are a portion of the spherical surface having two different points as their centers placed on the major axis of the oval-shaped cross-section, and the center point of the oval-shaped cross-section is positioned between the centers of the first and second light exit surfaces.

14. The optical lens of claim 1, wherein a region in the outer surface corresponding to the center point of the oval-shaped cross-section includes a recessed part.

15. A light source module comprising:
   a substrate;
   at least one light source disposed on a surface of the substrate; and
   an optical lens including a concave dome shaped inner surface having an oval-shaped cross-section in a plane parallel to the surface of the substrate, the concave dome shaped inner surface including a plurality of light incident surfaces stepped along the inner surface thereof and a plurality of stepped surfaces connecting the plurality of light incident surfaces to one another, and an outer surface surrounding the inner surface.

16. The module of claim 15, wherein the outer surface has a convex aspheric shape and includes first and second light exit surfaces provided to be respectively disposed in regions corresponding to both ends of a major axis of the oval-shaped cross-section and to have different curvatures.

17. The module of claim 16, wherein a curvature of the first and second light exit surfaces is smaller than that of other light exit surfaces of the outer surface, and the curvature of the second light exit surface is smaller than that of the first light exit surface.

18. The module of claim 16, wherein the light source is disposed by being horizontally moved by a predetermined distance from a center of the major axis to a region of the major axis corresponding to a position on which the first light exit surface is disposed.

19. The module of claim 16, wherein the plurality of light sources and the optical lens are disposed such that the second light exit surfaces are aligned in the same direction.

20. The module of claim 19, wherein the light source and optical lens are disposed by repetitively providing a pattern having a shape in which six other light sources and optical lenses are disposed to surround one of the light sources and the optical lens disposed at a center thereof in a hexagonal form.

21. The module of claim 20, wherein the hexagonal form defined by the six optical lenses has interior angles of 115 degrees with two apexes corresponding to a direction to which the first light exit surface of the plurality of optical lenses is directed and a direction to which the second light exit surface thereof is directed, and interior angles of the remaining four apexes of 122.5 degrees.

22. A street lamp including a light source module having an optical lens, the light source module comprising:
   a substrate;
   at least one light source disposed on a surface of the substrate; and an optical lens including a concave dome structure having an inner surface having an oval-shaped cross-section in a plane parallel to the surface of the substrate, and the inner surface including a plurality of light incident surfaces stepped along the inner surface and a plurality of stepped surfaces connecting the plurality of light incident surfaces to one another, and an outer surface surrounding the inner surface.

23. The street lamp of claim 22, wherein the outer surface has a convex aspheric shape and includes first and second light exit surfaces provided to be respectively disposed at regions of both ends of a major axis of the oval-shaped cross-section and to have different curvatures.

24. The street lamp of claim 23, wherein a curvature of the first and second light exit surfaces is smaller than that of other light exit surfaces of the outer surface, and the curvature of the second light exit surface is smaller than that of the first light exit surface.

\* \* \* \* \*